Patented Aug. 14, 1934

1,969,850

UNITED STATES PATENT OFFICE 1,969,850

CONDENSATION PRODUCT FROM HYDROAROMATIC RING KETONES

Ernst Korten, Fechenheim, near Frankfort-on-the-Main, Germany, assignor to General Aniline Works, Inc., New York, N. Y., a corporation of Delaware No Drawing. Application February 8, 1928, Serial No. 252,941. In Germany February 11, 1927

9 Claims. (Cl. 260—130.5)

I have found that new and valuable condensation products are obtained by allowing aromatic amines to act at elevated temperatures on hydroaromatic ring ketones in presence of an acid condensing agent. As aromatic amines primary, secondary and tertiary bases having a free paraposition to the nitrogen atom are suitable for my process. As appropriate hydroaromatic ring ketones, for example, cyclohexanone, cyclopentanone, tetralone, decalone and their homologues and substitution products, as acid condensing agents, for example, hydrochloric, sulfuric, oxalic and benzenesulfonic acid, zinc- and aluminiumchloride and so forth may be named. The reaction may be accelerated by working under pressure.

The reaction runs probably in such a way that the ketogroup of the hydroaromatic ring ketone reacts with the para-position of the amine used, whereby one molecule of water is split off and new condensation products are obtained, which contain generally one or two amine residues in their molecule. They correspond probably to the general formula:

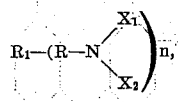

wherein $n$ is the number 1 or 2, R means an aromatic ring, $R_1$ a hydroaromatic hydrocarbon radical, wherein R and $R_1$ may contain further substituents, and $X_1$ and $X_2$ mean hydrogen or an alkyl- or aralkylgroup. In accordance herewith when using aniline and cyclohexanone as starting materials the two species of reaction products are represented by the following probable formulas:

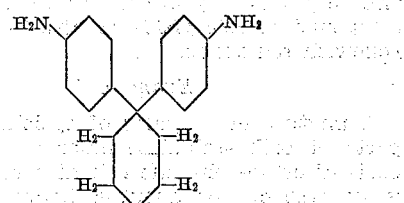

and

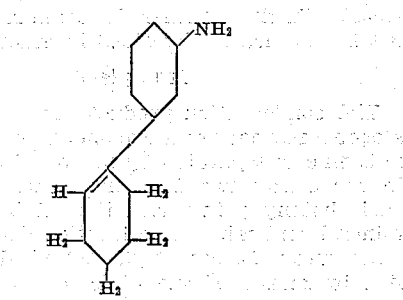

Generally mixtures of the di- and tri-nuclear products are obtained, the trinuclear condensation products appearing to be the primary reaction products, whereas the dinuclear products are formed by a secondary process during the course of the reaction, as I suppose, while splitting up one molecule of amine. (In consequence thereof it is possible and may be advantageous in many cases to produce the latter compounds by starting from the isolated trinuclear products and heating them again with acids or as such for instance by distillation.)

The percentage of the tri- and dinuclear products within the mixtures obtained by the reaction depends on the reaction conditions applied. When using a great excess of the amine almost exclusively the trinuclear products may be obtained. When allowing the amine to react on the ring ketone in about the molecular proportion 1:1, the formation of the dinuclear product is increased. The mixture may be used directly as starting materials for technical purposes, they may be separated into their components in the usual manner according to their different behaviour, for instance by fractional distillation or by treatment with suitable organic solvents or by crystallization of their salts.

The new condensation products are valuable intermediates for the production of dyestuffs and pharmaceutical products.

In order to further illustrate my invention the following examples are given, the parts being by weight and all temperatures in centigrade degrees.

Example 1

A solution of 30 parts of cyclohexanone and 100 parts of aniline in 350 parts of hydrochloric acid ($d$=1.06) is heated in an autoclave at 140–150°. After about 8 hours the reaction mass is rendered alkaline and the excess of the aniline is removed by means of steam. The remaining light oil solidifying in the cold is filtered off and dried. In order to isolate the pure tri-nuclear compound the reaction product may be treated with organic solvents. The tri-nuclear compound crystallizes from benzine in the form of long radiated needles of the melting point 111° (softening at 105°) and boils under a pressure of 12 mm. at 275–276°. The new compound corresponds probably to the formula:

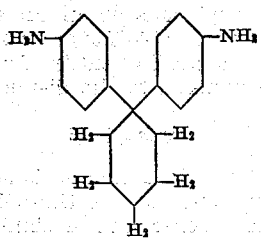

It is readily soluble in mineral acids, readily diazotizable and forms when diazotized and coupled, red azo dyestuffs.

Instead of hydrochloric acid other mineral acids may be used as condensing agents, for instance hydrobromic or sulfuric acid, or other condensing agents as zinc chloride may be added or used without the presence of any free acid.

Example 2

A mixture of 33 parts of cyclohexanone, 93 parts of aniline and 202 parts of sulfuric acid ($d=1.215$) is heated in an autoclave for 5–6 hours at 140–150° under pressure. The reaction mass forming a pulp of white crystals is rendered alkaline, freed from aniline by means of steam, acidified with hydrochloric acid and filtered from a small quantity of resinous byproducts. From this filtrate alkali precipitates the same reaction product as described in Example 1. The same reaction takes place if the sulfuric acid is substituted by derivatives thereof as for instance benzene-sulfonic acid.

Example 3

The raw oil obtained according to Example 1 is isolated from the aqueous solution in the usual manner, heated with an excess of sulfuric acid ($d=1.175$) and filtered in the cold from the precipitated sulfate. The residue is extracted with hot water, until the insoluble remaining substance when diazotized and coupled with 2-naphthol-3.6-disulfonic acid gives the characteristic violet red shade. The mother liquor from this sulfate yields the tri-nuclear base described in Example 1. From the insoluble remaining sulfate the pure di-nuclear base may be isolated. The new compound boils when pure under a pressure of 12 mm. at about 170–171°. It represents a transparent oil becoming slightly brown in the air. It corresponds probably to the formula:

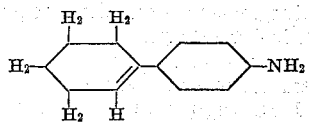

Its diazocompound couples with 2-naphthol-3.6-disulfonic acid forming a violet red azo dyestuff.

Example 4

The pure tri-nuclear condensation product from cyclohexanone and aniline described in Example 1 is distilled in vacuo. The distillation is slowly continued until the reaction of decomposition is finished and the whole mass distills under a pressure of 12 mm. between about 160 and 190° as an oil not solidifying at ordinary temperatures. The pure di-nuclear product may be isolated by means of its difficultly soluble hydrochloric acid salt. The free base has the properties as described in Example 3.

When heating the tri-nuclear product in a dilute mineral acid solution in an autoclave for some hours at about 150–200° or by heating it with the addition of a small quantity of a mineral acid it is also decomposed to the di-nuclear product.

Example 5

If in the Example 1 aniline is substituted by the equivalent amount of ortho-chloroaniline, a new tri-nuclear compound of similar properties is obtained, corresponding probably to the formula:

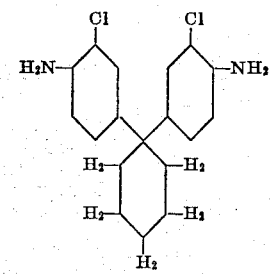

crystallizing from a mixture of benzene and benzine as snow white fine needles of the melting point 126–128°.

This condensation product yields when treated according to Example 4 a di-nuclear distillation product boiling under a pressure of 16 mm. at 196–198°, solidifying in the cold in the form of long radiated crystals of the melting point 32°. It corresponds probably to the formula:

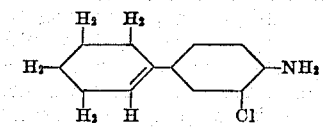

Example 6

A solution of 39.2 parts of cyclohexanone, 150 parts of ortho-toluidine in 130 parts of crude hydrochloric acid is heated for about 5 hours at 140–150° under pressure. The reaction product is worked up as described in Example 1. In this case almost exclusively a tri-nuclear condensation product is obtained in a very good yield. It corresponds probably to the formula:

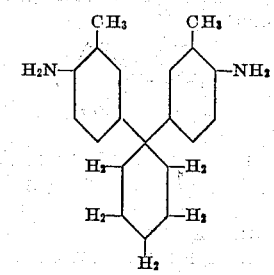

and crystallizes from benzene as fine clear needles of the melting point about 166°. It is readily soluble in hot benzene, difficultly in benzine and very difficultly in cold benzene. The diazocompound thereof yields azo dyestuffs of a more yellowish red shade.

Example 7

A mixture of 30 parts of cyclohexanone, 100 parts of ortho-toluidine chlorhydrate and 130 parts of ortho-toluidine is heated on an oil bath while stirring for about 6 hours at 150–160°. Then the mass is rendered alkaline and the excess of ortho-toluidine is removed by means of steam. In this manner the same reaction product is obtained as described in Example 6.

Example 8

The condensation product obtained in an analogous manner from cyclohexanone and ortho-anisidine is separated by means of a distillation in vacuo into two fractions clearly differing in their boiling points and the solubility of their mineral acid salts. The fraction distilling under a pressure of 12 mm. at 180–220° yields when purified by means of the difficultly soluble hydrochloric acid salt, a transparent oil boiling under a pressure of 12 mm. at 185–187°, solidifying in the cold. It corresponds probably to the formula:

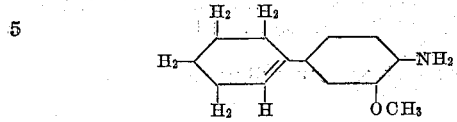

and crystallizes from benzine in the form of large scales of the melting point 59°. Its very stable diazocompound produces when coupled with 2-naphthol-3.6-disulfonic acid, a violet red azodyestuff.

The other fraction distilling above 220° at a pressure of 12 mm. yields the tri-nuclear compound corresponding probably to the formula:

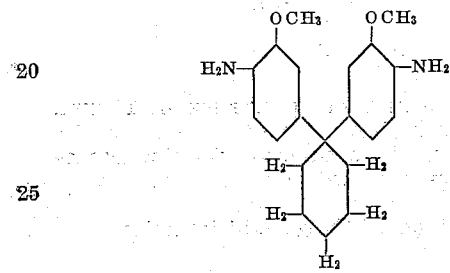

which boils when pure under a pressure of 12 mm. at 289°.

*Example 9*

A solution of 33 parts of cyclohexanone, 184 parts of the hydrochloric acid salt of monoethyl-ortho-toluidine in 200 parts of water is heated in an autoclave at 140–150° for about 6 hours. The reaction product is worked up as described in the foregoing examples and distilled in vacuo. After the unchanged starting material is distilled off, it separates into two fractions of the boiling points 180–185° and 275–280°. The first fraction represents a transparent readily mobile oil becoming brown in the air and corresponding probably to the formula:

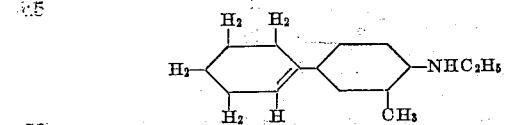

The last fraction contains the tri-nuclear condensation product crystallizing from boiling benzine in the form of white compact crystals of the melting point 118–120° and corresponding probably to the formula:

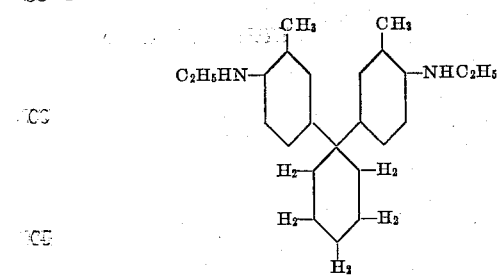

*Example 10*

A solution of 240 parts of cyclohexanone and 800 parts of dimethylaniline in 700 parts of hydrochloric acid ($d=1.18$) and 1700 parts of water is heated at about 160° for about 6 hours in an autoclave. The reaction mass is worked up as described in the foregoing examples. From the mixture the two species of condensation products can be easily isolated as the di-nuclear product is readily soluble in organic solvents for instance ether, the tri-nuclear one nearly insoluble. The di-nuclear product represents a colorless oil of the boiling point of 152–153° under a pressure of 3 mm. and corresponds probably to the formula:

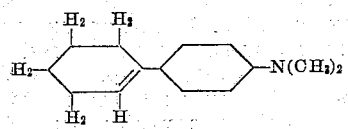

The tri-nuclear product crystallizes from benzine or benzene in the form of compact colorless needles of the melting point 158–160° (softening at 150–152°) and corresponds probably to the formula:

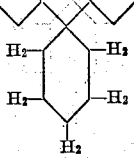

It is readily soluble in mineral acids and precipitable in a crystal form by addition of alkali.

The same result is obtained when using the equivalent amount of oxalic acid instead of hydrochloric acid.

If equimolecular amounts of cyclohexanone and dimethyl-aniline are used in the presence of hydrochloric acid at 180°, the yield of the di-nuclear product is very much increased. Generally I have observed that an elevation of the temperature or of the amount of the employed acid propagates the formation of the di-nuclear products.

*Example 11*

When using in Example 6 instead of cyclohexanone the equivalent amount of technical methyl-clyclohexanone and working otherwise in an analogous manner a new compound is obtained in a smooth reaction corresponding probably to the formula:

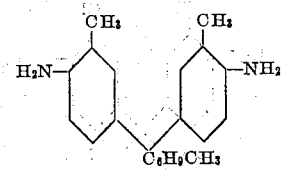

It crystallizes from benzine in the form of snow white felted needles of the melting point of about 138° (sintering 128–130°). Similar compounds may be obtained when other ketones are employed as for instance cyclopentanone, tetralone, decalone or the like.

I claim:

1. The process which comprises causing a salt of an aromatic amine having a free para-position to act on a hydroaromatic ring ketone at a temperature between about 140 and about 160° C.

2. The process which comprises causing a salt of an aromatic amine having a free para-position to act on a hydroaromatic ring ketone at a temperature between about 140 and about 160° C. and isolating the components in a pure state from the reaction product.

3. The products of the general formula:

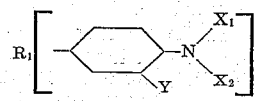

wherein $R_1$ represents a hexahydrophenyl radical, Y stands for hydrogen or chlorine or a methyl- or methoxy group, $X_1$ and $X_2$ mean hydrogen or an alkyl group, $n$ is the number 1 or 2 and, when $n$ is 2, both para-phenylene groups are attached to the same hexahydrophenyl carbon atom, which products have basic properties and form salts with acids.

4. The products corresponding to the general formula:

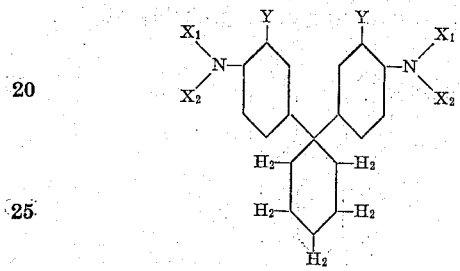

wherein $X_1$ and $X_2$ mean hydrogen or an alkyl-group, Y means hydrogen or chlorine or a methyl- or methoxy group, which products have basic properties and form salts with acids.

5. The product corresponding to the formula:

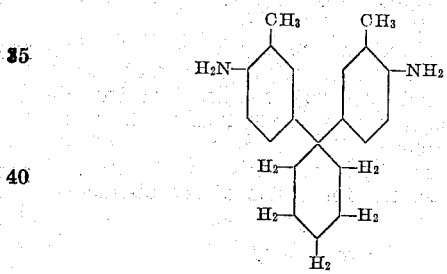

crystallizing from benzene in the form of light needles melting at about 166° C., having basic properties, forming salts with acids, being diazotizable and forming diazodyestuffs when combined with the usual azocomponents.

6. The product corresponding to the formula:

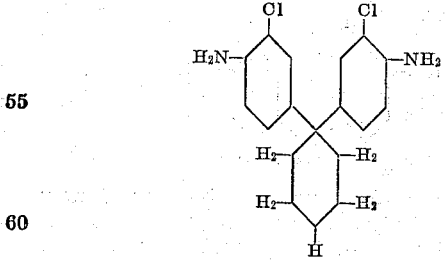

crystallizing from a mixture of benzene and benzine as snow-white, fine needles of the melting point 126-128° C., having basic properties, forming salts with acids, being diazotizable and forming disazodyestuffs when combined with the usual azocomponents.

7. The product corresponding to the formula:

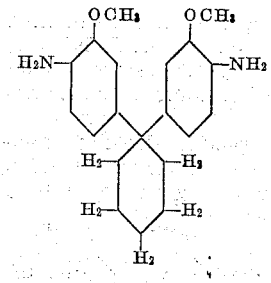

boiling when pure under a pressure of 12 mm. at 289° C., having basic properties, forming salts with acids, being diazotizable and forming disazodyestuffs when combined with the usual azocomponents.

8. The products of the general formula:

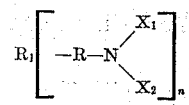

wherein R stands for a para-phenylene group, $R_1$ represents a hexahydrophenyl radical, $X_1$ and $X_2$ mean hydrogen or an alkyl group, $n$ is the number 1 or 2 and, when $n$ is 2, both para-phenyl groups are attached to the same hexahydrophenyl carbon atom, which products have basic properties and form salts with acids.

9. The products of the general formula:

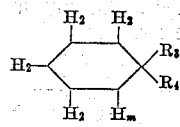

wherein $R_3$ and $R_4$ each stand for a para-amino phenyl radical in which case $m$ is 2, or $R_3$ stands for a para-amino phenyl radical and no substituent is present for the symbol $R_4$ in which case $m$ is 1, said products having basic properties and form salts with acids.

ERNST KORTEN.